United States Patent
Jagannatha et al.

(10) Patent No.: US 10,631,148 B1
(45) Date of Patent: Apr. 21, 2020

(54) SYSTEMS AND METHODS FOR QOS AWARE SIM REFRESH

(71) Applicant: Verizon Patent and Licensing Inc., Arlington, VA (US)

(72) Inventors: Deepa Jagannatha, Bridgewater, NJ (US); Taussif Khan, Martinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/268,809

(22) Filed: Feb. 6, 2019

(51) Int. Cl.
*H04W 4/60* (2018.01)
*H04W 84/04* (2009.01)
*H04W 12/00* (2009.01)
*H04L 12/24* (2006.01)
*H04L 29/06* (2006.01)

(52) U.S. Cl.
CPC .......... *H04W 4/60* (2018.02); *H04L 41/5087* (2013.01); *H04L 65/00* (2013.01); *H04W 12/00* (2013.01); *H04W 12/004* (2019.01); *H04W 84/042* (2013.01)

(58) Field of Classification Search
CPC ... H04W 4/60; H04W 84/042; H04W 12/004; H04W 12/00; H04W 12/0023; H04T 2001/113; H04L 29/06802; H04L 41/5087; H04L 65/00
See application file for complete search history.

(56) References Cited

U.S. PATENT DOCUMENTS

| | | | | |
|---|---|---|---|---|
| 10,360,021 B2* | 7/2019 | Pereira Cabral | ........ | G06F 8/656 |
| 10,425,795 B2* | 9/2019 | Mutikainen | ....... | H04W 36/0022 |
| 2002/0081971 A1* | 6/2002 | Travostino | .......... | H04L 67/2861 |
| | | | | 455/41.2 |
| 2005/0009522 A1* | 1/2005 | Bi | .......... | H04W 28/24 |
| | | | | 455/435.3 |
| 2006/0193295 A1* | 8/2006 | White | .................. | H04L 12/5692 |
| | | | | 370/336 |
| 2006/0215559 A1* | 9/2006 | Mese | .................. | H04W 52/265 |
| | | | | 370/232 |
| 2007/0270127 A1* | 11/2007 | Santoro | ............. | H04W 12/1206 |
| | | | | 455/411 |
| 2008/0198804 A1* | 8/2008 | Rahman | ............ | H04W 36/0011 |
| | | | | 370/331 |
| 2010/0035577 A1* | 2/2010 | Rager | ................. | H04L 63/1466 |
| | | | | 455/411 |
| 2010/0195503 A1* | 8/2010 | Raleigh | ............... | H04L 41/0806 |
| | | | | 370/235 |

(Continued)

*Primary Examiner* — Devan A Sandiford

(57) ABSTRACT

A computer device may include a memory storing instructions and processor configured to execute the instructions to receive a Subscriber Identity Module (SIM) refresh request. The processor may be further configured to identify one or more Quality of Service (QoS) classes for which, if an active communication session exists that is associated with at least one of the QoS classes, a SIM refresh should be rejected; access a database of active communication sessions associated with the UE device; determine that an active session, stored in the database of active communication sessions, is associated with at least one of the one or more QoS classes; and reject the SIM refresh request based on determining that the active session is associated with at least one of the one or more QoS classes.

20 Claims, 7 Drawing Sheets

(56) References Cited

U.S. PATENT DOCUMENTS

| | | | | |
|---|---|---|---|---|
| 2010/0273511 | A1* | 10/2010 | Chen | H04W 4/90 455/458 |
| 2011/0106946 | A1* | 5/2011 | Bao | H04L 65/40 709/225 |
| 2011/0136471 | A1* | 6/2011 | Chen | H04L 63/0853 455/411 |
| 2011/0274090 | A1* | 11/2011 | Hallensal | H04W 36/0022 370/331 |
| 2012/0208597 | A1* | 8/2012 | Billman | H04W 12/02 455/558 |
| 2012/0263119 | A1* | 10/2012 | Monogioudis | H04W 28/24 370/329 |
| 2012/0320884 | A1* | 12/2012 | Jamadagni | H04L 47/28 370/336 |
| 2013/0035083 | A1* | 2/2013 | Kadel | H04W 84/005 455/418 |
| 2013/0344857 | A1* | 12/2013 | Berionne | H04W 88/02 455/418 |
| 2014/0031052 | A1* | 1/2014 | Lagerqvist | H04W 72/10 455/452.1 |
| 2015/0099528 | A1* | 4/2015 | Hu | H04W 72/042 455/452.1 |
| 2015/0327207 | A1* | 11/2015 | Bharadwaj | H04W 8/04 455/435.2 |
| 2016/0373880 | A1* | 12/2016 | Khan | H04W 4/50 |
| 2017/0181038 | A1* | 6/2017 | Yeddala | H04W 28/20 |
| 2018/0041855 | A1* | 2/2018 | Chen | H04L 63/0853 |

* cited by examiner

SYSTEMS AND METHODS FOR QOS AWARE SIM REFRESH

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services and experiencing various types of different conditions. Maintaining the operation of a large number of devices associated with different types of services may pose various challenges.

DETAILED DESCRIPTION OF PREFERRED EMBODIMENTS

Figure 1:
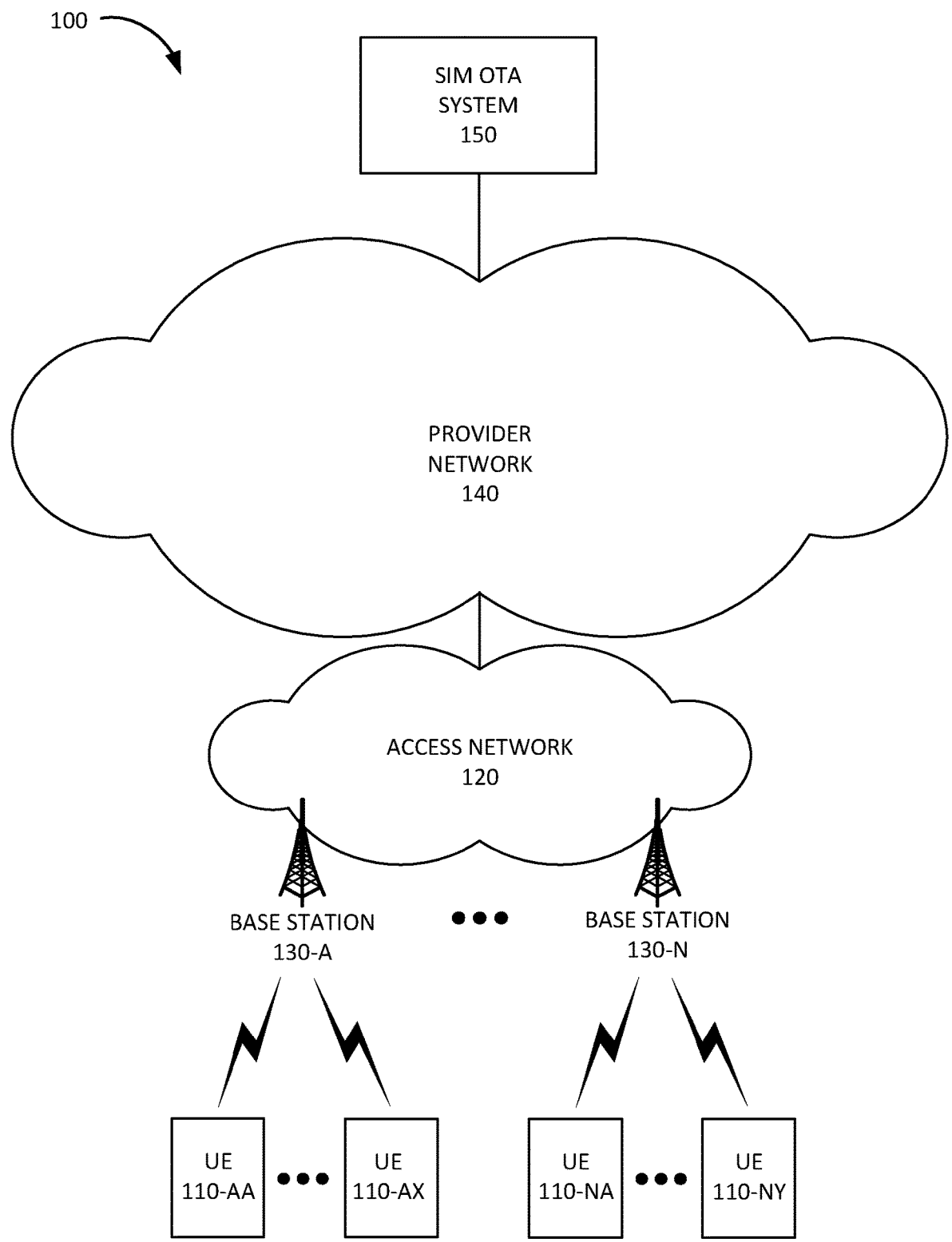
FIG. 1 is a diagram illustrating an environment according to an implementation described herein.

The following detailed description refers to the accompanying drawings. The same reference numbers in different drawings identify the same or similar elements.

A wireless communication device, also referred to herein as a user equipment (UE) device, may include a Subscriber Identity Module (SIM) card, or an embedded SIM (eSIM), that stores information relating to a subscription associated with the UE device. For example, a SIM card may include a Universal Integrated Circuit Card (UICC) that stores identification, authentication, and/or authorization information for accessing different types of networks. In order to keep a UE device functioning properly and to ensure secure access to a wireless access network, a provider of communication services may need to periodically update a SIM card with new information and/or instructions. The provider may perform a SIM card update, also referred to herein as a SIM refresh, to update the information and/or instructions stored on the SIM card. During the SIM refresh, the UE device may be unable to perform particular functions, such as process a telephone call. Thus, if a SIM refresh is performed while a call is in progress, the call may be dropped.

Because a SIM refresh can interfere with a call, the provider may require that a SIM refresh be not performed ("rejected") while a particular type of communication session, such as a call, is in progress. With circuit-switched calling, a modem may easily detect that a call is in progress and is able to reject a SIM refresh. However, calls are increasingly implemented as packet-switched calls, also referred to as Voice over Internet Protocol (VoIP). With a VoIP call, such as a Voice over Long Term Evolution (VoLTE) call, a modem may perceive the call as a data session and may not be able to distinguish the call from standard data sessions.

Implementations described herein relate to systems and methods for a Quality of Service (QoS) aware SIM refresh. A SIM card in a UE device may be configured to check with the modem of the UE device before initiating/performing a SIM refresh to make sure there are no active sessions associated with particular QoS classes, which may be disrupted by the SIM refresh. The modem may maintain a database (DB) of active sessions that identifies a QoS class for each active session and may reject a SIM refresh if there is an active session associated with a particular QoS class. Thus, the SIM card may not proceed with the SIM refresh until the SIM card receives a SIM refresh accept message from the modem.

For example, a SIM card in a UE device may be configured to receive a SIM refresh notification from a SIM Over-the-Air (OTA) system, which is configured to provide SIM updates to UE devices. The SIM card may then send a SIM refresh request to a modem included in the UE device, in response to receiving the SIM refresh notification from the SIM OTA system.

A modem in the UE device may receive the SIM refresh request from the SIM card; identify one or more QoS classes for which, if an active communication session exists that is associated with at least one of the QoS classes, a SIM refresh should be rejected; access a DB of active communication sessions associated with the UE device; determine that an active session, stored in the database of active communication sessions, is associated with at least one of the one or more QoS classes; and reject the SIM refresh request based on determining that the active session is associated with at least one of the one or more QoS classes. The modem may send a SIM refresh reject message to the SIM card.

In some implementations, the SIM card may send a notification to the SIM OTA system that the SIM refresh was rejected. In some implementations, the SIM card may wait a particular time period after receiving a reject message from the modem and re-try the SIM refresh after the particular time period, by re-sending the SIM refresh request to the modem. In other implementations, the modem may determine that the active session, associated with at least one of the one or more QoS classes, has ended and may send a SIM refresh accept message to the SIM card, in response to determining that the active session has ended. In yet other implementations, the SIM card may detect that the active session, associated with the at least one of the one or more QoS classes, has ended and may re-send the SIM refresh request to the modem, in response to detecting that the active session, associated with the at least one of the one or more QoS classes, had ended.

In some implementations, the one or more QoS classes may include a Voice over Long Term Evolution (VoLTE) QoS class or a Video over Long Term Evolution (ViLTE) QoS class. In other implementations, the one or more QoS classes may include a Voice over New Radio (VoNR) QoS class or a Video Over New Radio (ViNR) QoS class. In yet other implementations, the one or more QoS classes may include an Ultra-Reliable Low-Latency Communication (URLLC) QoS class, an autonomous vehicle QoS class, or an emergency communication QoS class.

Rejecting a SIM refresh when a modem is handling an active session associated with a particular QoS class improves the functioning of a UE device by preventing the session from being dropped. For example, a dropped session may interrupt critical services, and may require the UE device to re-establish the session, which may consume processor and memory resources of the UE device as well as consume network bandwidth and/or other types of network resources.

FIG. 1 is a diagram of an exemplary environment 100 in which the systems and/or methods described herein may be implemented. As shown in FIG. 1, environment 100 may include user equipment (UE) devices 110-AA to 110-NY (referred to herein collectively as "UE devices 110" and individually as "UE device 110"), an access network 120, a provider network 140, and a SIM OTA system 150.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; , a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous vehicle, an unmanned aerial drone, and/or another type of electronic device.

Access network 120 may provide access to provider network 140 for UE devices 110. Access network 120 may enable UE device 110 to connect to provider network 140 for mobile telephone service, Short Message Service (SMS) message service, Multimedia Message Service (MMS) message service, Internet access, cloud computing, and/or other types of data services.

Access network 120 may establish a connection between UE device 110 and provider network. For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140, such as, for example, Data over Non-Access Stratum (DoNAS).

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UE devices 110. For example, base station 130-A may service UE devices 110-AA to 110-AX, etc., and base station 130-N may service UE devices 110-NA to 110-NY. In other words, UE devices 110-AA to 110-AX may be located within the geographic area serviced by base station 130-A, and other UE devices 110 may be serviced by another base station 130. Base station 130 may include a 4G base station (e.g., an eNodeB). Additionally, or alternatively, base station 130 may include a 5G base station (e.g., a gNodeB).

Base station 130 may include one or more radio frequency (RF) transceivers (also referred to as "base station sectors") facing particular directions. For example, base station 130 may include three RF transceivers and each RF transceiver may service a 120° sector of a 360° field of view. Each RF transceiver may include an antenna array. For example, if base station 130 includes a gNodeB, the antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 130 may also include a 4G base station (e.g., an eNodeB).

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

SIM OTA system 150 may include one or more devices, such as computer devices and/or server devices, which manage SIM cards in UE devices 110. For example, SIM OTA system 150 may generate an update to be provided to SIM cards during a SIM refresh and may send a notification to UE devices 110 to perform a SIM refresh. In some implementations, SIM OTA system 150 may broadcast a SIM update to UE devices 110 and may receive messages from UE devices 110 that failed to perform the SIM update informing SIM OTA system 150 of the failure. In other implementations, a SIM card may initiate a SIM refresh by responding to the SIM refresh notification and SIM OTA system 150 may provide a SIM update to a particular UE device 110 from which the response was received.

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
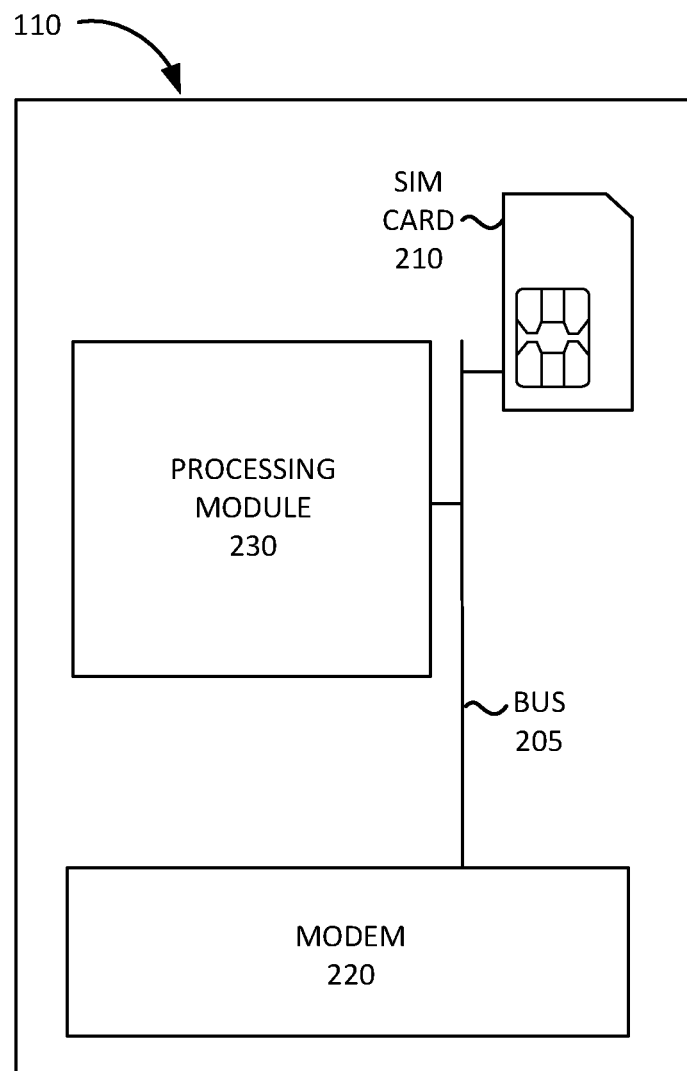
FIG. 2 is a diagram illustrating an exemplary Subscriber Identity Module (SIM) and modem in a user equipment (UE) device of FIG. 1 according to an implementation described herein.

FIG. 2 is a diagram illustrating an exemplary SIM card and modem in UE device 110. As shown in FIG. 2, UE device 110 may include a bus 205, a SIM card 210, a modem 220, and a processing module 230.

Bus 205 may include a path that permits communication among the components of UE device 110. SIM card 210 may include a removable Universal Integrated Circuit Card (UICC). In other implementations, SIM card 210 may include an eSIM that is embedded in UE device 110. In other words, an eSIM may include an integrated SIM chip that is attached to a logic board and is not removable from UE device 110. SIM card 210 may store subscription information associated with the user, such as, for example subscription IDs including an International Mobile Subscriber Identity (IMSI) number, a Mobile Station International Subscriber Directory Number (MSISDN), a Mobile Directory Number (MDN), a Session Initiation Protocol (SIP) address, and/or by another type of subscription ID. Furthermore, SIM card 210 may include authentication and/or authorization information for obtaining access to access network 120 and/or provider network 140.

Modem 220 may be configured to communicate with base station 130. For example, modem 220 may generate baseband signals and convert the generated baseband signal into RF signals to send to base station 130 and may receive RF signals from base station 130 and convert the received RF signals into baseband signals. Modem 220 may maintain a DB of active communication sessions established via base station 130 and may store information identifying a QoS class associated with each active communication session.

Processing module 230 may include a processor, memory, storage device, and/or other components enabled to implement the functionality of UE device 110. For example, processing module 230 may run applications on UE device 110 and may use modem 220 to communicate with other devices via base station 130.

Although FIG. 2 shows exemplary components of UE device 110, in other implementations, UE device 110 may include fewer components, different components, differently arranged components, or additional functional components than depicted in FIG. 2. Additionally, or alternatively, one or more components of UE device 110 may perform functions described as being performed by one or more other components of UE device 110.

Figure 3:
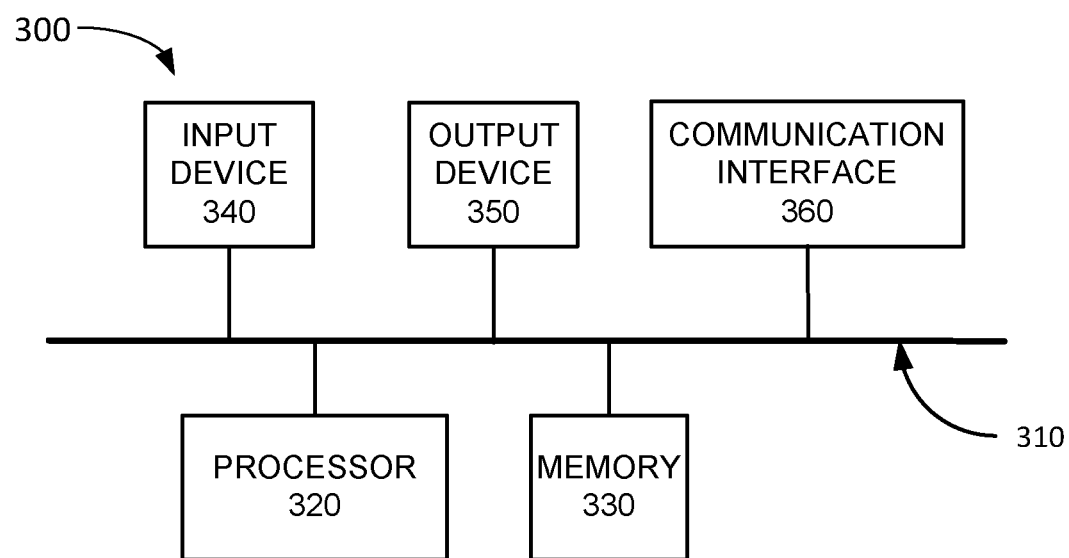
FIG. 3 is a diagram illustrating exemplary components of a user equipment (UE) device of FIG. 1 according to an implementation described herein.

FIG. 3 is a diagram illustrating example components of a device 300 according to an implementation described herein. UE device 110, SIM card 210, modem 220, processing module 230, base station 130, and/or SIM OTA system 150 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to QoS aware SIM refresh. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
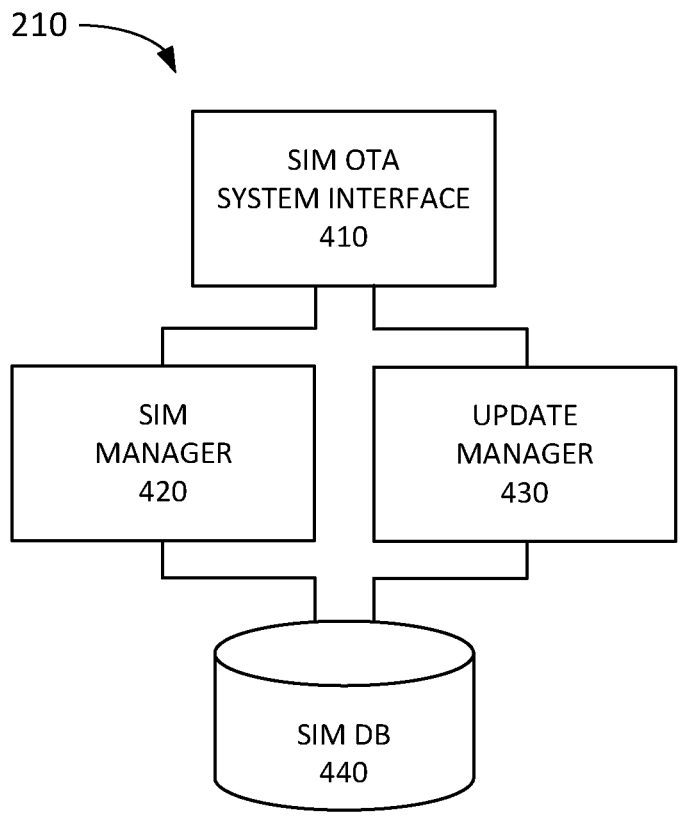
FIG. 4 is a diagram illustrating exemplary functional components of the SIM of FIG. 2 according to an implementation described herein.

FIG. 4 is a diagram illustrating exemplary functional components of SIM card 210. The functional components of SIM card 210 may be implemented, for example, via processor 320 executing instructions from memory 330. Alternatively, some or all of the functional components of SIM card 210 may be implemented via hard-wired circuitry. As shown in FIG. 4, SIM card 210 may include a SIM OTA system interface 410, a SIM manager 420, an update manager 430, and a SIM DB 440.

SIM OTA system interface 410 may be configured to communicate with SIM OTA 150. For example, SIM OTA system interface 410 may receive a SIM refresh notification from SIM OTA 150 and/or may receive information associated with a SIM refresh. Furthermore, SIM OTA system interface 410 may send information to SIM OTA system 150, such as information indicating whether a particular SIM refresh was performed successfully or whether the particular SIM refresh was rejected.

SIM manager 420 may manage the operation of SIM card 210. For example, SIM manager 420 may authenticate UE device 110 for accessing access network 120, for accessing provider network 140, for accessing an IMS network in provider network 140, and/or for using a particular application or service. SIM manager 420 may use information stored in SIM DB 440 for performing the authentication. SIM DB 440 may store one or more subscription IDs and/or authentication keys for subscriptions associated with UE device 110.

Update manager 430 may perform SIM refresh updates. For example, update manager 430 may receive an indication from SIM OTA system interface 410 that a SIM refresh is to be performed and send, in response, a SIM refresh request to modem 220. If modem 220 accepts the SIM refresh, update manager 430 may perform the SIM refresh by contacting SIM OTA system 150 to obtain the SIM refresh information. If modem 220 rejects the SIM refresh, update manager 430 may wait a particular time period to re-send the SIM refresh request and/or may wait for an indication from modem 220 that a particular active session has ended and/or that the SIM refresh may now be performed.

Although FIG. 4 shows exemplary functional components of SIM card 210, in other implementations, SIM card 210 may include fewer functional components, different functional components, differently arranged functional components, or additional functional components than depicted in FIG. 4. Additionally, or alternatively, one or more functional components of SIM card 210 may perform functions described as being performed by one or more other functional components of SIM card 210.

Figure 5:
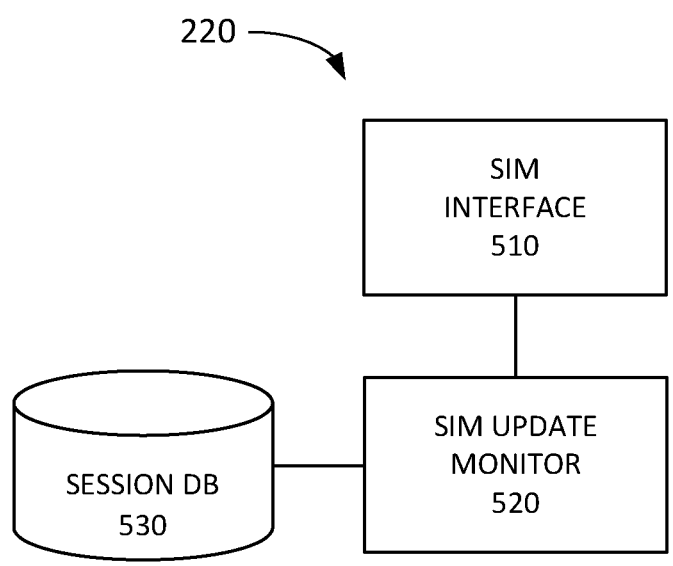
FIG. 5 is a diagram illustrating exemplary functional components of the modem of FIG. 2 according to an implementation described herein.

FIG. 5 is a diagram illustrating exemplary functional components of modem 220. The functional components of modem 220 may be implemented, for example, via processor 320 executing instructions from memory 330. Alternatively, some or all of the functional components of modem 220 may be implemented via hard-wired circuitry. As shown in FIG. 5, modem 220 may include a SIM interface 510, a SIM update monitor 520, and a session DB 530.

SIM interface 510 may be configured to communicate with SIM card 210. For example, SIM interface 510 may receive a SIM refresh request from SIM card 210 and may provide a SIM refresh accept or reject message back to SIM card 210 from SIM update monitor 520 in response.

SIM update monitor 520 may determine whether a SIM refresh is allowed to proceed based on information stored in session DB 530. Session DB 530 may store information relating to active communication sessions associated with UE device 110. For example, each time UE device 110 initiates a new communication session, SIM update monitor 520 may generate a new record in session DB 530 for the initiated session. The generated session record stored in session DB 530 may include information identifying the session, information identifying a QoS class associated with the session, information identifying a particular service class associated with the session, and/or other types of information that may be used to determine whether a SIM refresh should be performed when the session is active.

As an example, if base station 130 includes a 4G LTE base station, the QoS class information for the session may identify whether the session corresponds to one of guaranteed bit rate (GBR) QoS classes, such as a voice telephone call session or VoLTE session (e.g., QoS Class ID (QCI)=1), a live video streaming session or ViLTE session (e.g., QCI=2), a real-time gaming session (e.g., QCI=3), or a buffered video streaming session (e.g., QCI=4); or one of non-GBR QoS classes, such as an IMS signaling session (e.g., QCI=5), a video session (e.g., QCI=6), an interactive gaming session (e.g., QCI=7), a Transfer Control Protocol (TCP) based privileged subscriber session (e.g., QCI=8), or a TCP based non-privileged subscriber session (e.g., QCI=9). As another example, if base station 130 includes a 5G NR base station, the QoS class information for the session may identify whether the session corresponds to a VoNR QoS class, a ViNR QoS class, a URLLC QoS class, an autonomous vehicle QoS class, an emergency communication QoS class (e.g. an E911 QoS class), and/or another type of QoS class.

Additionally, session DB 530 may store information identifying for which QoS classes and/or service classes, if an active communication session exists that is associated with at least one of the QoS classes or service classes, a SIM refresh should be rejected. For example, session DB 530 may store information identifying a VoLTE QoS class, a ViLTE QoS class, a VoNR QoS class, a ViNR QoS class, a URLC QoS class, an autonomous vehicle QoS class, and/or an emergency communication QoS class as QoS class for which a SIM refresh should be rejected if an active communication session exists in session DB 530 that is associated with at least one of these QoS classes.

SIM update monitor 520 may determine whether an active communication session exists that is associated with at least one of the QoS classes for which a SIM refresh should be rejected and may send a SIM refresh reject message to SIM card 210 if such an active communication session exists. Otherwise, SIM update monitor 520 may send a SIM refresh accept message to SIM card 210.

Although FIG. 5 shows exemplary functional components of modem 220, in other implementations, modem 220 may include fewer functional components, different functional components, differently arranged functional components, or additional functional components than depicted in FIG. 5. Additionally, or alternatively, one or more functional components of modem 220 may perform functions described as being performed by one or more other functional components of modem 220.

In other implementations, UE device 110 may include an application that performs the functions described as being performed by modem 220 in FIG. 5. The application may use an Application Programing Interface (API) associated with modem 220 to query modem 220 to determine whether there is an active session associated with a particular QoS class being processed by modem 220. The application may store the information obtained from modem 220 in a session DB. SIM card 210 may then be configured to send a SIM refresh request to the application.

Figure 6:
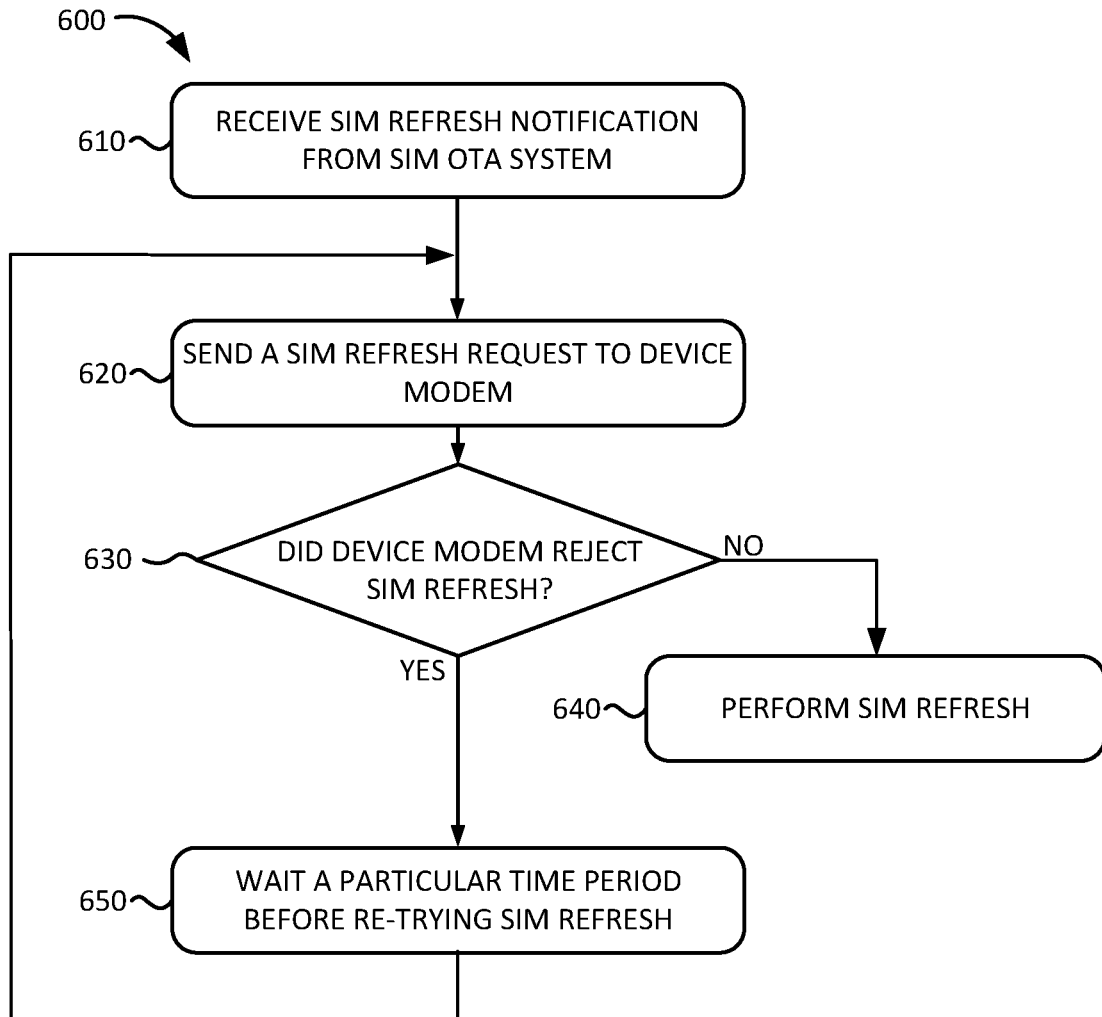
FIG. 6 is a flowchart of a first process for a SIM refresh according to an implementation described herein.

FIG. 6 is a flowchart 600 of a first process for a SIM refresh according to an implementation described herein. In some implementations, the process of FIG. 6 may be performed by SIM card 210. In other implementations, some or all of the process of FIG. 6 may be performed by another device or a group of devices separate from SIM card 210.

The process of FIG. 6 may include receiving a SIM refresh request from SIM OTA system 150 (block 610). For example, SIM OTA system 150 may generate an update for SIM card 210 and SIM card 210 may receive the SIM refresh notification. A SIM refresh request may be sent to the device modem (block 620). For example, SIM card 210 may be configured to check with modem 220 to make sure modem 220 accepts the SIM refresh and may, therefore, send a SIM refresh request to modem 220.

A determination may be made as to whether the device modem rejected the SIM refresh (block 630). If the SIM refresh request was not rejected by the device modem (block 630—NO), the SIM refresh may be performed (block 640). For example, SIM card 210 may send a request to SIM OTA system 150 to receive the update associated with the SIM refresh. If the SIM refresh request was rejected by the device modem (block 630—YES), SIM card 210 may wait for a particular time period before re-trying the SIM refresh (block 650) and processing may return to block 620. Additionally, or alternatively, SIM card 210 may re-try the SIM refresh by sending another SIM refresh request to modem 220 in response to determining that a particular communication session has ended or in response to determining that a SIM refresh may be performed. For example, modem 220 may send an indication to SIM card 210 that a communication session has ended and/or that a SIM refresh may be performed.

Figure 7:
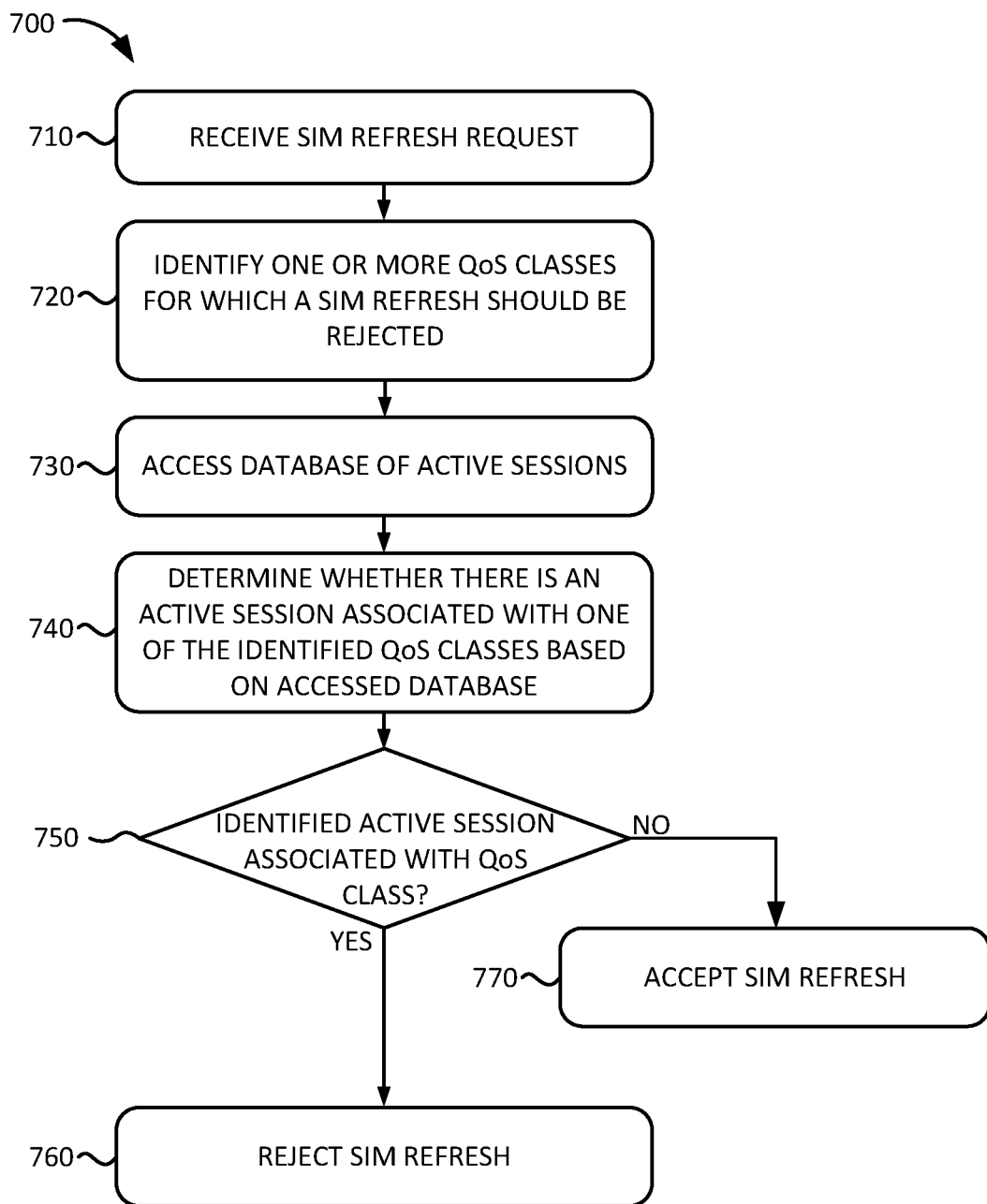
FIG. 7 is a flowchart of a second process for a SIM refresh according to an implementation described herein.

FIG. 7 is a flowchart 700 of a second process for a SIM refresh according to an implementation described herein. In some implementations, the process of FIG. 6 may be performed by modem 220. In other implementations, some or all of the process of FIG. 6 may be performed by another device or a group of devices separate from modem 220.

The process of FIG. 7 may include receiving a SIM refresh request (block 710). For example, modem 220 may receive a SIM refresh request from SIM card 210. One or more QoS classes may be identified for which a SIM request should be rejected (block 720). For example, modem 220 may determine which QoS and/or service classes correspond to QoS and/or service classes for which a SIM refresh should be rejected if an active communication session is associated with one of the QoS and/or service classes. For example, modem 220 may identify any QoS class associated with voice communication or live video as a QoS class for which a SIM refresh should be rejected if there is an active communication session, being handled by modem 220, which is classified as a voice communication or live video session.

A DB of active sessions may be accessed (block 730) and a determination may be made as to whether there is an active session associated with one of the identified QoS classes based on the accessed DB (blocks 740 and 750). For example, modem 220 may access session DB 530 to determine whether there are any active sessions classified as a voice communication or live video session.

If it is determined that there is an identified active session associated with an identified QoS class (block 750—YES), the SIM refresh may be rejected. For example, modem 220 may send a SIM refresh reject message to SIM card 210. If it is determined that there is no identified active session associated with an identified QoS class (block 750—NO), the SIM refresh may be accepted. For example, modem 220 may send a SIM refresh accept message to SIM card 210. In response, SIM card 210 may perform the SIM refresh.

Figure 8:
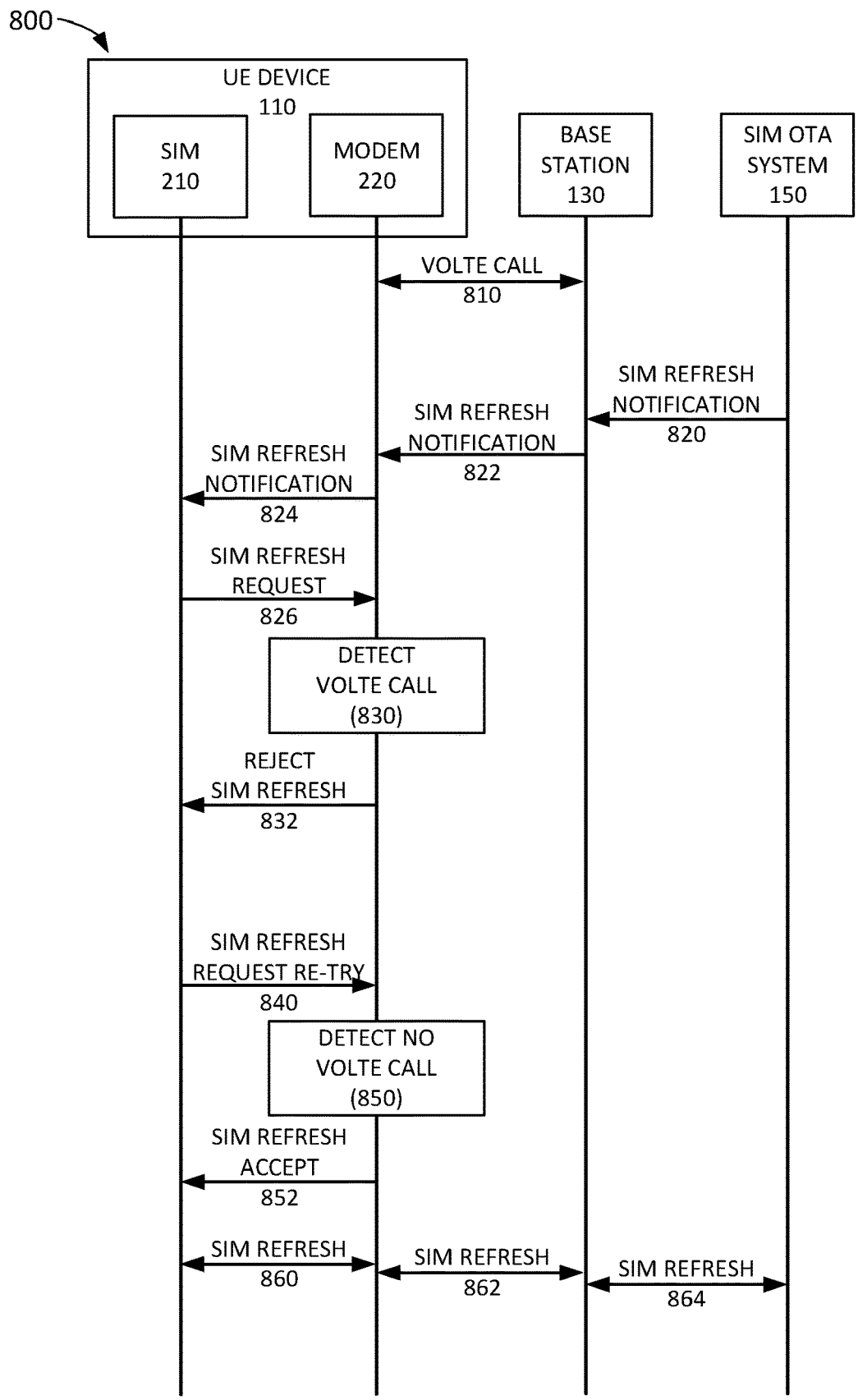
FIG. 8 is an exemplary signal flow diagram according to an implementation described herein.

FIG. 8 is an exemplary signal flow diagram 800 according to an implementation described herein. Signal flow 800 may include UE device 110 initiating a VoLTE call via modem 220 communicating with base station 130 (signal 810). While the VoLTE call is in progress, SIM card 210 may receive a SIM refresh notification from SIM OTA system 150 via base station 130 and modem 220 (signals 820, 822, and 824). In response, SIM card 210 may send a SIM refresh request to modem 220 (signal 826).

Modem 220 may determine that a VoLTE call is in progress (block 830). In response, modem 220 may send a SIM refresh reject message to SIM card 210 (block 832). SIM card 210 may then wait for a predetermined time period and then re-try the SIM refresh request by re-sending the SIM refresh request to modem 220 (block 840). Assume that the VoLTE call has ended. Modem 220 may therefore determine that the SIM request may proceed and may send a SIM refresh accept message to SIM card 210 (block 852). In response to receiving the SIM refresh accept message, SIM card 210 may initiate the SIM refresh by contacting SIM OTA system 150 via modem 220 and base station 130 (signals 860, 862, and 864).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signal flows has been described with respect to FIG. 8, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a user equipment (UE) device, a Subscriber Identity Module (SIM) refresh request;
   identifying, by the UE device, one or more Quality of Service (QoS) classes for which, if an active communication session exists that is associated with at least one of the QoS classes, a SIM refresh should be rejected;
   accessing, by the UE device, a database of active communication sessions associated with the UE device;
   determining, by the UE device, that an active session, stored in the database of active communication sessions, is associated with at least one of the one or more QoS classes; and
   rejecting, by the UE device, the SIM refresh request based on determining that the active session is associated with at least one of the one or more QoS classes.

2. The method of claim 1, wherein the one or more QoS classes include at least one of a Voice over Long Term Evolution (VoLTE) QoS class or a Video over Long Term Evolution (ViLTE) QoS class.

3. The method of claim 1, wherein the one or more QoS classes include at least one of a Voice over New Radio (VoNR) QoS class or a Video Over New Radio (ViNR) QoS class.

4. The method of claim 1, wherein the one or more QoS classes include at least one of an Ultra-Reliable Low-Latency Communication (URLLC) QoS class, an autonomous vehicle QoS class, or an emergency communication QoS class.

5. The method of claim 1, further comprising:
   receiving, by a SIM card included in the UE device, a SIM refresh notification from a SIM Over-the-Air (OTA) system configured to provide SIM updates to UE devices;

sending, by the SIM card, the SIM refresh request to a modem included in the UE device, in response to receiving the SIM refresh notification from the SIM OTA system; and wherein rejecting the SIM refresh request based on determining that the active session is associated with at least one of the one or more QoS classes includes:

sending, by the modem, a reject message to the SIM card.

6. The method of claim 5, further comprising:

waiting, by the SIM card, a particular time period after receiving the reject message; and re-sending, by the SIM card, the SIM refresh request to the modem after the particular time period has elapsed.

7. The method of claim 5, further comprising:

determining, by the modem, that the active session, associated with at least one of the one or more QoS classes, has ended; and sending a SIM refresh accept message to the SIM card, in response to determining that the active session has ended.

8. The method of claim 5, further comprising:

detecting, by the SIM card, that the active session, associated with the at least one of the one or more QoS classes, had ended; and re-sending, by the SIM card, the SIM refresh request to the modem, in response to detecting that the active session, associated with the at least one of the one or more QoS classes, had ended.

9. The method of claim 5, further comprising:

sending a notification to the SIM OTA system that the SIM refresh was rejected.

10. The method of claim 5, further comprising:

configuring the SIM card to send a SIM refresh request to the modem and receiving a SIM refresh accept message before performing a SIM refresh process.

11. A system comprising:

a device comprising:
 a memory storing instructions; and
 a processor configured to execute the instructions to:
  receive a Subscriber Identity Module (SIM) refresh request;
  identify one or more Quality of Service (QoS) classes for which, if an active communication session exists that is associated with at least one of the QoS classes, a SIM refresh should be rejected;
  access a database of active communication sessions associated with the UE device;
  determine that an active session, stored in the database of active communication sessions, is associated with at least one of the one or more QoS classes; and
  reject the SIM refresh request based on determining that the active session is associated with at least one of the one or more QoS classes.

12. The system of claim 11, wherein the one or more QoS classes include at least one of a Voice over Long Term Evolution (VoLTE) QoS class or a Video over Long Term Evolution (ViLTE) QoS class.

13. The system of claim 11, wherein the one or more QoS classes include at least one of a Voice over New Radio (VoNR) QoS class or a Video Over New Radio (ViNR) QoS class.

14. The system of claim 11, wherein the one or more QoS classes include at least one of an Ultra-Reliable Low-Latency Communication (URLLC) QoS class, an autonomous vehicle QoS class, or an emergency communication QoS class.

15. The system of claim 11, further comprising:

a SIM card configured to:
 receive a SIM refresh notification from a SIM Over-the-Air (OTA) system configured to provide SIM updates to UE devices; and
 send the SIM refresh request to a modem associated with the processor, in response to receiving the SIM refresh notification from the SIM OTA system; and wherein, when rejecting the SIM refresh request based on determining that the active session is associated with at least one of the one or more QoS classes, the processor is further configured to:

send a reject message to the SIM card.

16. The system of claim 15, wherein the SIM card is further configured to:

wait a particular time period after receiving the reject message; and re-send the SIM refresh request to the modem after the particular time period has elapsed.

17. The system of claim 15, wherein the processor is further configured to:

determine that the active session, associated with at least one of the one or more QoS classes, has ended;

send a SIM refresh accept message to the SIM card, in response to determining that the active session has ended.

18. The system of claim 15, wherein the SIM card is further configured to:

detect that the active session, associated with the at least one of the one or more QoS classes, had ended; and re-send the SIM refresh request to the modem, in response to detecting that the active session, associated with the at least one of the one or more QoS classes, had ended.

19. The system of claim 15, wherein the SIM card is further configured to:

send a notification to the SIM OTA system that the SIM refresh was rejected.

20. A wireless communication device comprising:

a modem;
a Subscriber Identity Module (SIM) card configured to:
 receive a SIM refresh notification from a SIM Over-the-Air (OTA) system configured to provide SIM updates to user equipment (UE) devices; and
 send the SIM refresh request to the modem, in response to receiving the SIM refresh notification from the SIM OTA system; and
wherein the modem is configured to:
 receive the SIM refresh request;
 identify one or more Quality of Service (QoS) classes for which, if an active communication session exists that is associated with at least one of the QoS classes, a SIM refresh should be rejected;
 access a database of active communication sessions associated with the UE device;
 determine that an active session, stored in the database of active communication sessions, is associated with at least one of the one or more QoS classes; and
 reject the SIM refresh request based on determining that the active session is associated with at least one of the one or more QoS classes.

* * * * *